May 8, 1956  K. E. B. BREDTSCHNEIDER  2,744,651
PRESSURE VESSEL
Filed Oct. 16, 1952  3 Sheets-Sheet 1
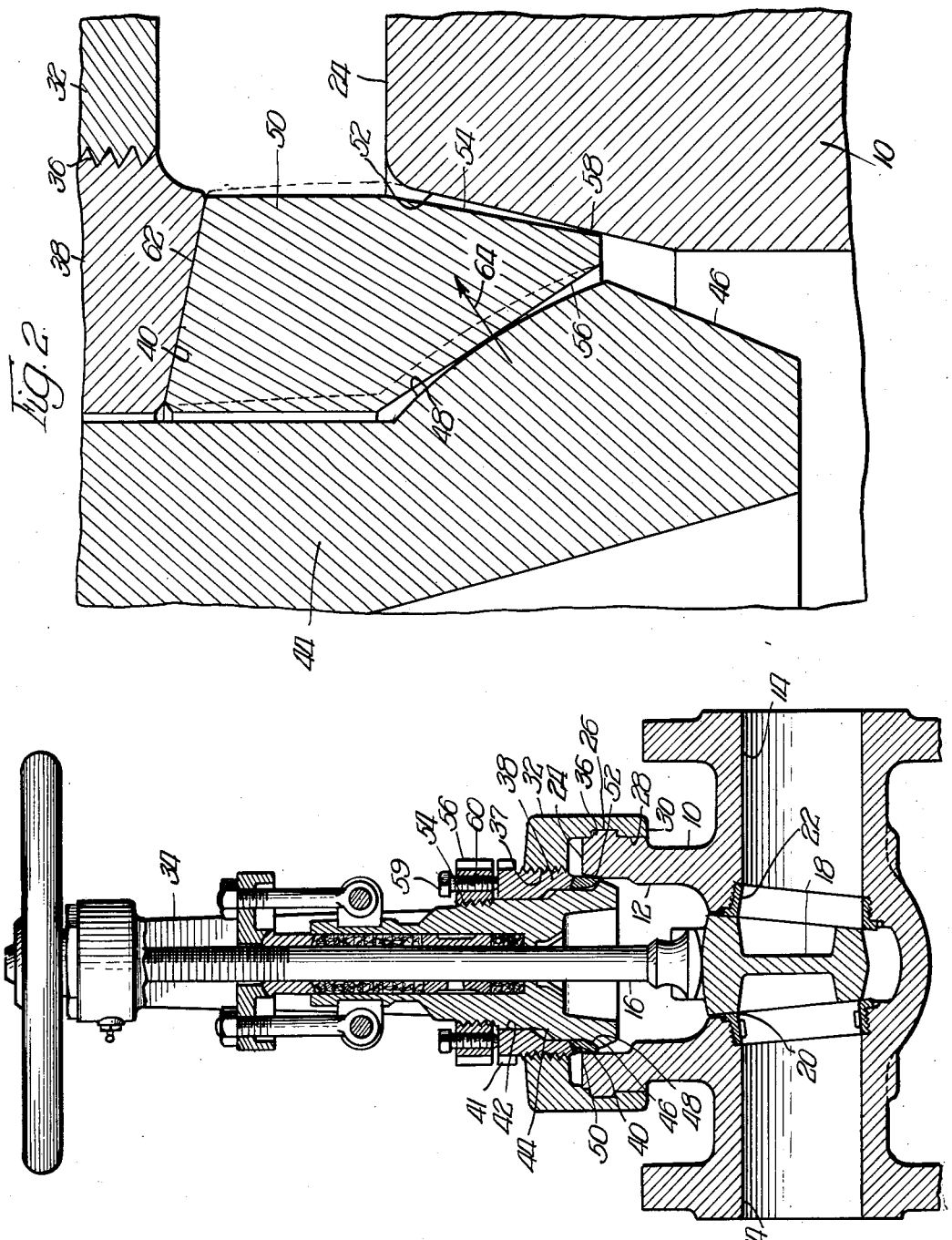
INVENTOR.
Kurt E. B. Bredtschneider,
BY Wilkinson, Huxley,
Byron & Hume
Attys.

May 8, 1956 K. E. B. BREDTSCHNEIDER 2,744,651
PRESSURE VESSEL
Filed Oct. 16, 1952 3 Sheets-Sheet 2
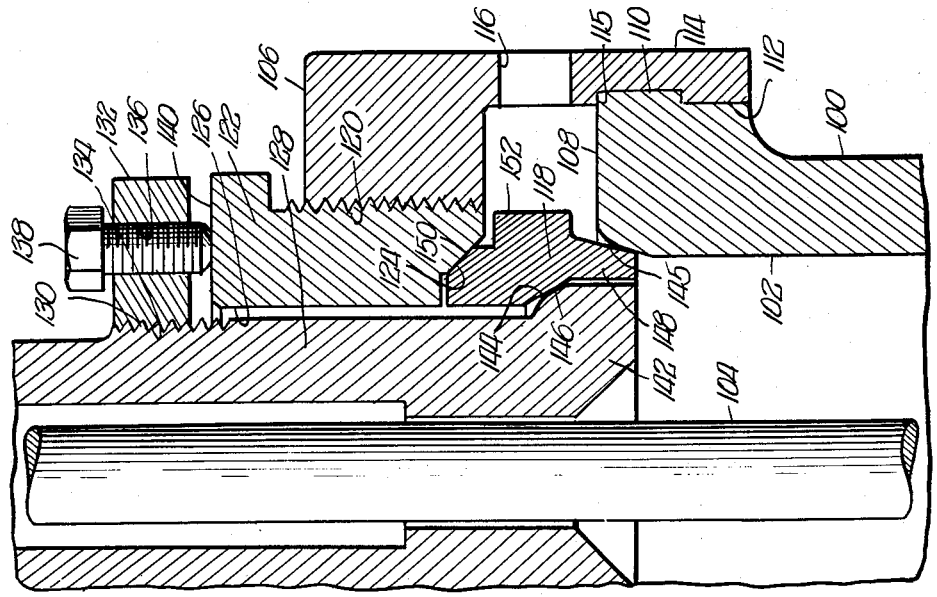
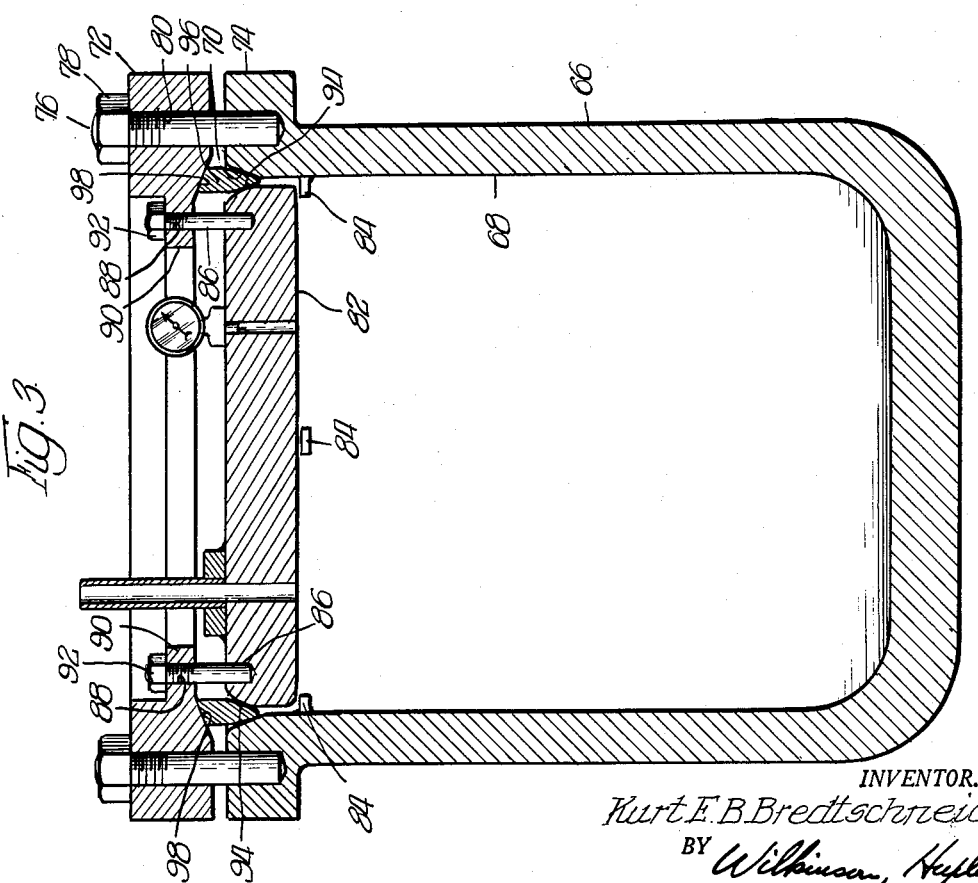
INVENTOR.
Kurt E. B. Bredtschneider,
BY Wilkinson, Huxley,
Byron + Hume
ATTYS May 8, 1956  K. E. B. BREDTSCHNEIDER  2,744,651
PRESSURE VESSEL Filed Oct. 16, 1952  3 Sheets-Sheet 3

INVENTOR.
Kurt E. B. Bredtschneider,
BY Wilkinson, Huxley,
Byron & Hume
ATTYS

United States Patent Office 2,744,651
Patented May 8, 1956

2,744,651

PRESSURE VESSEL

Kurt E. B. Bredtschneider, Chicago, Ill., assignor to Crane Co., Chicago, Ill., a corporation of Illinois Application October 16, 1952, Serial No. 315,111

5 Claims. (Cl. 220—46)

This invention relates to pressure vessels for use with fluids under high pressures, and more particularly to vessels having a pressure seal closure utilizing the pressure of the fluid to increase the tightness of the seal. This application is a continuation-in-part of applicant's previous applications, Serial No. 186,337, filed September 23, 1950, and Serial No. 272,659, filed February 20, 1952. The invention, which is the subject matter of this present application, represents an improvement over the inventions disclosed in those previously filed applications, although it incorporates many of the novel features thereof.

As was the case in those inventions, one of the main objects of the present invention, when applied to valve construction, for example, is to provide a valve in which the pressure seal in the bonnet joint is formed at the extreme upper edge of the opening in the body of the valve in which the valve and valve carrying stem are disposed. This construction is made possible by providing an annular outer abutment member which is disposed in secured relation to the body member adjacent to, but wholly without, that opening, and an inner abutment member having a portion thereof normally disposed within that opening, the remaining portion of that inner member protruding from the opening in telescopic relation to the outer abutment member.

An axially opposed surface is provided on the outer abutment member which is substantially coincident with and disposed in overlapping relation to the outer extremity of the opening in the body of the valve. An axially opposed surface is also provided on the inner abutment member which latter surface is so aligned with the axially opposed surface on the outer abutment member that an annular sealing means may be disposed between the two opposed surfaces, so as to engage the upper edge of the wall of the opening.

In other words, it is an object of this invention to provide a pressure vessel for high pressure fluids such as a valve, for example, which has a sealing means, the sealing action of which varies directly with the pressure of the fluid to be sealed.

A further object is to provide a sealing means for pressure vessels, such as valves or the like, which means incorporates a sealing ring disposed so that it is adapted to be expanded by the cooperative action of outer and inner, telescopically disposed abutment members, against the inner wall of an opening in said pressure vessel.

Yet another object is to provide a sealing ring in such a pressure vessel and bearing surfaces associated therewith, which elements have a form and disposition such that there is initially only a line contact between the ring and the body wall of the vessel, and between the ring and an inner abutment member which is adapted to exert outward pressure on the ring, which aids in eliminating the possibility of freezing and sticking of the ring.

Another object of the invention is to provide a pressure seal assembly for pressure vessels which incorporates a sealing ring disposed in association with the upper edge of the main body of the vessel, which ring is of such a configuration that the upper portion of the ring is without the upper lip of the vessel, and therefore is neither exposed to the high temperatures within the vessel nor expanded beyond the elastic limit of the material from which it is composed. This in turn insures that the major portion of the ring will return to substantially its original configuration when unloaded, and thus will not stick or freeze.

It is still another object to provide a pressure vessel of the character described in the form of a valve which, because of the unusual location of the sealing means therein, may have the stuffing box disposed entirely without the body where it is less likely to be exposed to extreme temperatures.

Still another object is to provide a pressure vessel of the character described in which the fastening surfaces between the outer abutment member and the body of the pressure vessel (such as a breech lock coupling) are disposed on the outside of the body and are therefore easier to maintain and inspect, and are not exposed to the fluid contained in or flowing through the vessel. Likewise, the means of securing these two members together may be utilized to reinforce the surface within the opening in the body against which the seal is formed.

Yet another object is to provide a pressure vessel of the character described which may be in the form of a valve in which the position of the outer abutment member relative to the body of the valve may be adjusted without affecting the position of adjustment of the yoke member or the coupling between the abutment member and the body of the valve. The yoke member may therefore be given any desired radial position relative to the main body of the valve.

A further object is to provide a pressure vessel of the character described which may be in the form of a valve in which the bearing surface on the wall of the opening which is abutted by the sealing ring is very accessible. Therefore any special hard surfacing material may be easily applied to form that bearing surface, and it likewise will be easier to machine, inspect and maintain. Similarly, this disposition of the bearing surface will make it a comparatively easy matter to remove or apply the sealing ring.

Still another object of the invention is to provide a lighter and more compact and less expensive pressure vessel which is relatively simple in design and yet which provides a seal which is in every way equal to or better than the seal previously formed in pressure vessels over which the present construction is an improvement.

Further objects and advantages of this invention will become evident as the description proceeds and from an examination of the accompanying drawing which illustrates one embodiment of the invention and in which similar numerals refer to similar parts throughout the several views.

In the drawing:

Fig. 1 is a view in elevation and partly in vertical section of a pressure vessel in the form of a pressure seal bonnet valve embodying the invention;

Figure 2 is a fragmentary enlarged view in elevation and partly in vertical section of a portion of the valve shown in Figure 1 showing the pressure seal assembly in greater detail;

Figure 3 is a view in vertical section of a pressure vessel other than a valve having the same general form of pressure seal shown in Figures 1 and 2;

Figure 4 is a fragmentary enlarged view in vertical section of a portion of a pressure seal valve embodying an alternative form of the invention, the pressure seal assembly being shown in detail;

Figure 5:
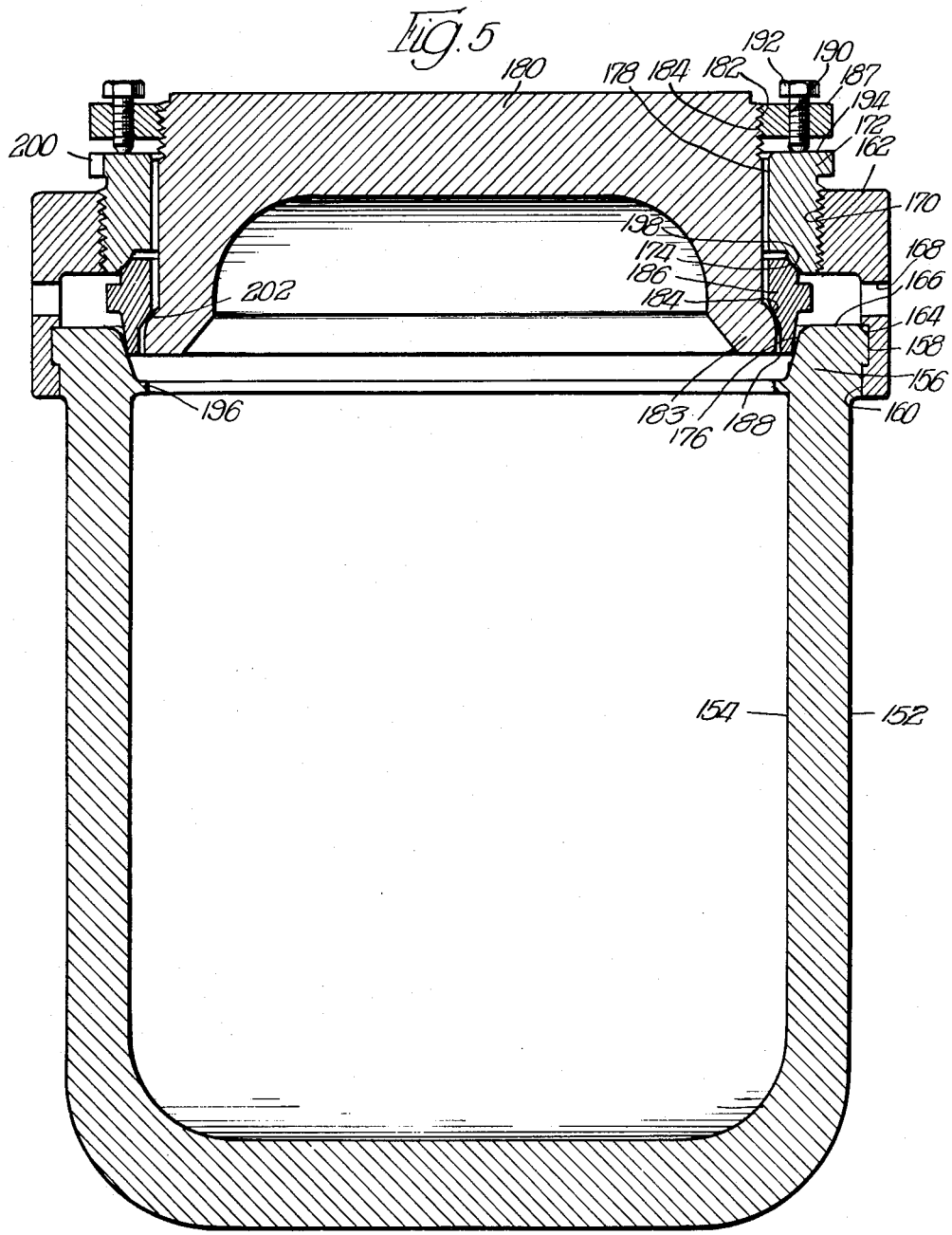
Figure 5 is a view in vertical section of a pressure vessel having a pressure seal assembly of substantially the same form as shown in Figure 4.

Referring now to Figures 1 and 2, one form of pressure seal bonnet valve embodying the invention is shown therein, the valve having a body 10 which is provided in turn with an opening 12 therein, which opening communicates with the through flow passage 14. The valve stem member 16 is disposed within the opening 12 and carries at its lower end the wedge disc 18 adapted to be seated on the body seat rings 20 and 22 to close the flow passage 14, when desired.

The upper lip 24 of the body 10 may have a plurality of spaced lugs 26 formed thereon adapted to cooperate with a plurality of similar spaced lugs 28 projecting inwardly from the lower lip 30 of the base 32 of the yoke member 34. The lugs 26 are formed with sufficient space therebetween to permit the lugs 28 on the base 32 of the yoke 34 to be inserted therethrough. The shoulder 36 is formed on the base 32 of the yoke 34 so that it projects inwardly and is spaced from the lugs 28 a sufficient distance to permit the lugs 26 on the body 10 to be received between the lugs 28 and the shoulder 36. When the valve is being assembled, therefore, after the lugs 28 have been moved downwardly between the lugs 26 and the shoulder 36 is in abutment with the lugs 26, the yoke 34 may be rotated so that the lugs 28 are brought into holding engagement with the lugs 26.

The base 32 of the yoke member 34 is generally in the form of an annular collar and provided with the internally threaded central opening 37. This opening 37 is adapted to receive the externally threaded outer abutment member 38. As best shown in Figure 2, this latter member is provided with an axially opposed annular surface 40 at its lower end, which surface may be sloped downwardly away from the longitudinal axis of the valve. This surface 40 might also have a shoulder formed therein in place of the slope. The upper end of the outer abutment member 38 is provided with lugs 41 which are adapted to cooperate with a suitable tool so that the position of the surface 40 relative to the lip 24 of the body may be readily adjusted.

The annular outer abutment member 38 is also provided with a central opening 42 which is adapted to slidably receive an inner abutment member 44, which, in turn, receives the slidably mounted stem member 16. The lower end of the inner abutment member 44 has an annular lip 46 formed thereon which has an angularly disposed bearing surface 48 formed on the upper edge thereof. This surface 48 may preferably have a convex cross-sectional configuration. A sealing ring 50 may be disposed between the axially opposed surfaces 40 and 48 in abutment with the bearing surface 52 adjacent the inner edge of the lip 24 of the body 10, which bearing surface preferably slopes downwardly and inwardly relative to the longitudinal axis of the valve. As best shown in Figure 2, the lower portion of the sealing ring 50 is tapered, the outer surface 54 thereof sloping downwardly and inwardly, whereas the inner surface 56 slopes downwardly and outwardly, relative to the longitudinal axis of the valve. The angle formed by the surface 54 is slightly less with respect to the longitudinal axis than the angle formed by the surface 52 so that the lower edge 58 of the surface 54 is adapted to make a line contact with the surface 52.

In addition, the height and diameter of the sealing ring 50 is such that the upper portion thereof projects substantially above the upper edge of the lip 24 even when it is firmly seated on the inner surface 52 thereof. This construction of the sealing ring and the surface associated therewith causes a major portion of the ring to be disposed without the opening 12 in the body 10 of the valve. This in turn insures that this portion of the sealing ring, which is without the opening 12, will remain relatively cool. By maintaining this portion of the ring at a relatively low temperature, it is never expanded beyond its elastic limit when placed under compression by relative movement between the outer member 38 and the inner member 44. In regaining its original shape after the compressive forces are released the portion of the ring outside the opening 12 exerts a controlling influence on the lower portion 58 of the sealing ring, which portion is disposed inside the opening 12 and which may be subjected to a temperature and a pressure such that it will quite possibly be plastically deformed, at least in part. This influence is such that it will reduce the friction pressure between the sealing ring and the body opening sufficiently so that the ring can be dismantled without force and without damage to the bearing surfaces.

Since the outer abutment member 38 is threadedly received within the base 32 of the yoke 34 it may be moved downwardly so as to seat and compress the sealing ring 50 on the sealing surface 52. This preliminary tightening of the sealing ring 50 is a very desirable feature of the sealing assembly since it can take place without the rotation of the yoke member 34. The central portion of the inner abutment member 44 may be threaded as at 54 so that the abutment ring 56 may be threadedly received thereon. This ring, in turn, is provided with a plurality of bolts 59 threadedly received in the threaded openings 60, therein, which bolts are adapted to abut the upper surface of the outer abutment member 38, as best shown in Figure 1.

The upper surface 62 of the annular sealing ring 50 is complementary to the axially opposed annular surface 40 of the lower end of the outer abutment member 38 and therefore may be sloped outwardly and downwardly relative to the longitudinal axis of the valve. If a shoulder is provided in the surface 40, a complementary shoulder will be provided in the surface 62, however. This configuration of the surfaces 40 and 62, together with the form of the surfaces 48, 52, 54 and 56, previously described, causes the sealing ring 50, when compressed between the inner abutment member 44 and the outer abutment member 38, to be distorted in a rather novel manner. This form of distortion in combination with the maintenance of the upper portion of the sealing ring at a relatively low temperature substantially eliminates the possibility of freezing and sticking of the ring upon the dismantling of the sealing assembly.

More specifically, when the sealing ring 50 is compressed by upward movement of the inner abutment member 44 relative to the outer abutment member 38, an expansion force is applied by the surface 48 substantially in the direction of the arrow 64 shown in Figure 2. Because of the angular disposition of the surfaces previously mentioned, the upper end of the sealing ring 50 is held against outward expansion by the outer abutment member 38, whereas the tapered lower end of the expansion ring 50 is likewise held from outward expansion by the surface 52 on the body 24 of the valve. The application of force in the direction of the arrow 64 therefore has a tendency to cause the central portion of the ring 50 to expand in substantially the manner illustrated by the dotted lines in Figure 2. Obviously there will also be some distortion of some of the surfaces adjacent to the sealing ring 50, such as the surface 52, but only the distortion of the ring 50 is shown in the drawing. When the sealing ring is unloaded, the movement indicated by the dotted lines, of course, reverses and the elastic energy accumulated in the relatively cold portion of the ring 50, outside of the body opening 12, compresses the partly plastically deformed portion of the ring adjacent the end 58 within the body opening 12. The frictional pressure, particularly at the lower end of the ring 50, is thereby lowered.

Thus the cool part of the ring outside the valve opening is so designed both as to dimensions and configuration that it will be expanded and bent outwardly under internal load only within the elastic limits of the sealing ring material. This elastically expanded part of the ring outside of the vessel opening serves to compress the lower hot part of the ring within the opening when the joint is unloaded because of its tendency to regain its former shape and the frictional pressure between the sealing ring and the body opening is reduced to such a degree that the ring can be dismantled without force, and the resultant damage to the bearing surfaces that often occurs.

An application of this same general form of sealing assembly to a more conventional form of pressure vessel is disclosed in Figure 3. The vessel is provided with a main body 66 having an opening 68, the upper edge 70 of which is beveled to form a bearing surface in substantially the same manner as the surface 52, previously described in connection with the valve body shown in Figures 1 and 2. The sealing assembly for the vessel 66 is made up of the annular outer abutment member 72 which is adapted to be held in association with the upper end 74 of the vessel 66 by the bolts 76 and the nuts 78, adapted to cooperate therewith. The bolts 76 are secured to the upper end 74 of the vessel 66 and openings 80 in the outer abutment member 72 are provided into which these bolts are adapted to extend.

The inner abutment member 82 has a diameter slightly smaller than the diameter of the openings 68 in the pressure vessel and it is adapted to be initially supported in association with the end 74 of the vessel 66 by the lugs 84, disposed within the opening 68 immediately below the bearing surface 70 on the end 74. The inner abutment member 82 is provided with a plurality of bolts 86 which are secured thereto and which are adapted to extend upwardly through suitable openings 88 provided in the inwardly extending flange 90 on the outer abutment member 72. The nuts 92 are adapted to be received by the upper ends of the bolts 88 so that by tightening down on these nuts 92 the inner abutment member 82 can be drawn upwardly toward the outer abutment member 72. The convex outer upper edge of the inner abutment member 82 serves as an abutment surface designed to contact the sealing ring member 96 in substantially the same way as the abutment surface 48 on the inner abutment member 44, previously described and shown in Figure 2. Likewise, an abutment surface 98, beveled downwardly and outwardly with respect to the longitudinal axis of the pressure vessel, is provided on the outer abutment member 72, which surface is generally similar to the surface 40 on the outer abutment member 38 described previously and shown in Figure 2. The sealing ring 96 is of the same cross-sectional configuration as the sealing ring 50 shown and described in Figures 1 and 2.

This form of sealing assembly shown in Figure 3 may be initially put in place on the pressure vessel by first placing the inner abutment member 82 within the opening 68 so that its lower outer edge rests on the lugs 84, as shown in Figure 3. The sealing ring member 96 is then disposed so that it is seated in the substantially V-shaped groove formed between the upper outer edge 94 of the inner sealing member 82 and the upper inner edge 70 of the upper portion 74 of the main body 66 of the pressure vessel. The outer abutment member 72 may then be put in place by permitting the bolts 76 to enter the appropriate openings 80 therein and at the same time permitting the bolts 86 associated with the inner abutment member 82 to enter the openings 88 in the flange 90 of the outer abutment member 72.

A preliminary tightening of the sealing assembly can be accomplished by tightening the nuts 78 on the bolts 76 which adjustment serves to daw the outer abutment member 72 into closer association with the main body 66 of the pressure vessel. After this has been done, the nuts 92 can be tightened on the bolts 86, which action serves to draw the inner abutment member 82 upwardly toward the outer abutment member 72 and simultaneously compresses the sealing ring 96 between the abutment surfaces 70, 94 and 98. The compressive forces so applied produce a distortion in the sealing ring 96 which is comparable to the distortion previously described in connection with the sealing ring 50, shown in Figure 2. Likewise, all of the advantages stemming from the construction described in connection with the embodiment shown in Figure 2 are characteristic of the sealing assembly just described.

Another alternative embodiment of the invention is disclosed in Figure 4 in which a fragmentary portion of a pressure seal valve of generally the same construction of that shown in Figure 1 is represented. In this embodiment the valve body 100 corresponds substantially to the valve body 10 previously shown in Figures 1 and 2. The valve body is provided with the central opening 102 in which is disposed the valve stem 104. The annular base portion 106 of the yoke member (not shown) corresponds generally to the base member 32 for the yoke member 34 shown in Figure 1. The upper portion 108 of the main body 100 is provided with a plurality of lug members 110 with which the corresponding lug members 112 on the bottom 114 of the base member 106 are adapted to cooperate. A suitable shoulder 115 is provided in spaced relation to the lugs 112 to engage the lugs 110 so that the base member 106 can be locked in engagement with the upper end 108 of the valve body 100, substantially in the same manner as previously described in connection with the engagement of the base member 32 and the body 10 of the valve shown in Figures 1 and 2. The base member 106, in addition, is provided with a plurality of radial openings 116 which are designed to permit circulation of air around the sealing ring 118, as will be subsequently described.

The upper portion of the base member 106 is provided with an internally threaded opening 120 which is adapted to threadedly receive the annular outer abutment member 122, the lower edge of this abutment member 122 being provided with an abutment surface 124 which extends downwardly and outwardly with respect to the longitudinal axis of the valve. The outer abutment member 122 is provided with a central opening 126 through which the valve stem 104 is adapted to extend, together with the annular inner abutment member 128.

This latter member has an externally threaded portion 130 which is adapted to threadedly receive an abutment ring 132 which is provided with an internally threaded opening 134. A plurality of threaded openings 136 are also provided in the abutment ring 132 which are adapted to threadedly receive the bolt members 138, which in turn abut at their lower end the upper surface 140 of the outer abutment member 122. The lower end 142 of the inner abutment member 128 is in the form of an outwardly projecting flange, the upper surface 144 of which preferably has a convex cross-sectional configuration.

The inner edge 145 of the upper portion 108 of the body 100 of the valve extends downwardly and inwardly with relation to the longitudinal axis of the valve and valve stem 104. The sealing ring 118 is adapted to be disposed between the bearing surfaces 124, 144 and 145 substantially in the same fashion as the sealing ring 50 shown in Figure 2 was disposed between the bearing surfaces 40, 48 and 52. It should be noted, however, that the sealing ring 118 differs considerably in its cross-sectional configuration from the sealing ring 50 previously described. Another distinction is that the bearing surface 144 abuts the bearing surface 146 provided on the inner surface of the sealing ring 118 at a point well above the upper portion 108 of the body 100 of the valve. The bearing surface 146 on the sealing ring 118 extends downwardly and outwardly with respect to the longitudinal axis of the valve. Likewise, the lower end 148 of the sealing ring 118 is elongated so that it extends substantially below the bearing surface 146 and therefore the line contact which is initially made between the lower end 148 and the bearing surface 145 on the upper portion 108 on the body 100 is considerably below the point at which the bearing surface 144 abuts the bearing surface 146. This design results in a very large portion of the sealing ring 118 being disposed outside of the opening 102 in the body 100 of the valve, so that only the small frusto-conical lip 148 is directly associated with the hot valve opening. The upper portion of the sealing ring 118 is provided with a beveled bearing surface 150 which is complementary to the bearing surface 124 on the outer abutment member 122 and extends downwardly and outwardly with respect to the longitudinal axis of the valve. If desired, the central portion of the sealing ring 118 may be in the form of a heavy flange 152, which serves to increase the mass of the ring which is outside of the valve opening at a point where it is exposed to the atmosphere through the openings 116 in the base 106 of the yoke member so that it will remain at a relatively low temperature with respect to the temperature of the lower portion 148 which is within the opening 102.

The operation of this sealing assembly is similar to that previously described for the form shown in Figures 1, 2 and 3, although the application of the compression force is made at a point which is more likely to cause greater elastic deformation of the sealing ring. This increases the amount of energy accumulated in the cold part of the ring which is available for recompression of the plastically deformed portion 148 in the valve opening. As a result the reduction of the friction between the sealing ring 118 and the valve opening 102 when the valve is unloaded is even more pronounced and the possibility of freezing or sticking is even more remote in this form of assembly.

The openings 116 in the base member 106 of the yoke of the valve has been previously mentioned. The presence of these openings, together with the increased mass of the sealing ring in an area associated with these openings, insures that the deformation of the upper portion of the sealing will not be beyond the elastic limit so that the major portion of the ring when the valve is unloaded will immediately tend to return to its original form and position and will automatically overcome any tendency for sticking or freezing at the lower end 148 of the ring.

An embodiment of this form of the invention in a pressure seal vessel is shown in Figure 5 in which a vessel having a main body 152 and a central opening 154 is shown. The upper portion 156 of the body 152 is provided along its outer edge with a plurality of lugs 158 which are in turn adapted to cooperate with the lugs 160 provided on the bottom of the annular collar member 162. The lower portion of the collar member is also provided with a shoulder 164 spaced above the lugs 160, which shoulder is adapted to abut the upper edge 166 of the upper portion 156 of the body 152 when the collar is secured in place. Openings 168 similar to the openings 116 previously described with relation to the embodiment shown in Figure 4 are also provided.

The upper portion of the collar 162 is provided with an internally threaded central opening 170, which opening is adapted to receive the externally threaded annular abutment member 172. This abutment member 172 is provided with an abutment surface 174 on its lower edge, which surface 174 slopes outwardly and downwardly with relation to the longitudinal axis of the body 152 of the pressure vessel. The upper portion 156 of the body 152 of the vessel is also provided with a beveled bearing surface 176, which surface extends downwardly and inwardly with relation to the longitudinal axis of the pressure vessel.

The outer abutment member 172 is provided with a central opening 178 in which the inner abutment member and cover 180 is adapted to be received. This latter member 180 is provided with a threaded portion 182 adjacent the upper edge thereof which threaded portion is adapted to cooperate with the threaded opening 184 in the abutment ring 187. This ring is in turn provided with threaded openings 190 which are adapted to receive the bolts 192. These bolts normally abut the upper surface 194 of the outer abutment member 172 so that the position of the inner abutment member 180 relative to the outer abutment member 172 may be altered, at will, by appropriate adjustment thereof.

The inner abutment member and cover 180 may be substantially cylindrical in shape and preferably is provided with an outwardly extending flange 183 at the lower edge thereof, which flange may be provided with a convex bearing surface 184 similar to the bearing surface 144 on the inner abutment member 128, shown in Figure 4. The sealing ring 186 has substantially the same cross-sectional configuration as the sealing ring 118 shown in Figure 4 and is disposed so that the lower end 188 thereof abuts the bearing surface 176 on the upper end 156 of the body 152 of the pressure vessel. As shown in Figure 5, the sealing ring 186 is also abutted by the bearing surfaces 184 and 174 and is adapted to be compressed therebetween when the inner abutment member 180 is moved upwardly relative to the outer abutment member 172, by appropriate adjustment of the bolts 190.

In order to assemble the sealing elements shown in Figure 5, if a suitable flange 196 is provided on the interior surface of the pressure vessel immediately below the bearing surface 176, the inner abutment member 180 can be first placed within the opening 154 with the bottom 183 thereof resting on the flange. The sealing 186 may then be inserted over the internal abutment member 180 so that its lower end 188 abuts the bearing surface 176. The collar member 162 may then be secured in place by proper engagement of the lugs 158 and 160 with either the outer abutment member 172 already threaded therein, or the latter member may be so threaded after the collar 162 is in place. In any event, the outer abutment member 172 may be threaded downwardly until the bearing surface 174 thereon moves into abutment with the bearing surface 198 on the upper edge of the sealing ring 186. Suitable lugs 200 may be provided on the upper portion of the outer abutment member 172 to permit this threading of that member into the collar member 162 with an appropriate tool. A preliminary tightening of the outer abutment member 172 on the sealing ring 186 may thus be accomplished.

The abutment ring 187 may then be threaded on to the upper portion of the inner abutment member 180 and the preliminary tightening of the sealing assembly can then be completed by tightening the bolts 192.

Of course, if it is undesirable to have an obstruction such as the flange 196 in the vessel, this element can be omitted and the assembly can be accomplished by first inserting the sealing ring over the inner abutment member 180 so that the abutment surface 202 on the sealing ring 186 is in contact with the bearing surface 184 on the lower flange portion 183 of the inner abutment member 180. The outer abutment member can then be inserted over the inner abutment member 180 and the abutment ring 186 can then be threaded on to the upper portion of the inner abutment member 180. This combination of elements forms a unit which can then be threaded into the collar member 162 and the whole assembly then placed into association with the upper portion 156 of the pressure vessel so that the lugs 158 and 160 can be moved into locking engagement. Alternatively, of course, the collar member 162 could first be placed in locking engagement with the upper portion 156 of the pressure vessel 152 and the previously assembled parts, as described, could then be threaded into the collar member 162.

The advantages of this form of sealing assembly are substantially the same as those which were described in connection with the embodiment shown in Figure 4. The sealing ring 186 has the same characteristics as the sealing ring 118 previously described and therefore the danger of freezing or sticking of the bottom portion 188 of the ring is also substantially eliminated in this embodiment.

The invention which has thus been described provides a sealing assembly which has many significant advantages over conventional forms, which advantages, as experience in the field has shown, are of great practical value.

In the drawing and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

It is claimed:

1. In a high pressure vessel having a hollow body member with a circular opening therein of which the upper edge is outwardly and upwardly beveled, a sealing assembly comprising an outer member disposed entirely without said opening, said outer member held in secured relation to said body member, an inner member normally disposed in telescopic relation to said outer member with a portion thereof extending into said opening, axially opposed surfaces on said outer member and said inner member, and an annular sealing ring member disposed between said axially opposed surfaces, said sealing ring member having a lower outer edge engaging said upper edge of said opening in said body member and having a substantial upper portion disposed externally of said opening, said axially opposed surface on said inner member normally engaging said sealing ring member along a line above the line of engagement of said ring member with said upper edge of said opening in said body member, said axially opposed surface on said outer member having a portion facing inwardly for resisting the outward radial movement of the upper surface of said sealing ring member when said sealing ring member is compressed between said axially opposed surfaces.

2. In a high pressure vessel having a hollow body member with a circular opening therein of which the upper edge is outwardly and upwardly beveled, a sealing assembly comprising an outer member disposed entirely without said opening, said outer member held in secured relation to said body member, an inner member normally disposed in telescopic relation to said outer member with a portion thereof extending into said opening, axially opposed surfaces on said outer member and said inner member, at least a portion of said axially opposed surfaces on each of said inner and outer members being sloped downwardly away from the longitudinal axis of said opening, an annular sealing ring member disposed between said axially opposed surfaces having a lower outer edge in sealing engagement with said upper edge of said opening in said body member and an upper portion projecting above said opening, and means for causing relative movement between said inner and outer members so as to compress said sealing ring member therebetween.

3. In a high pressure vessel having a hollow body member with a circular opening therein of which the upper edge is outwardly and upwardly beveled, a sealing assembly comprising an outer member disposed entirely without said opening, said outer member held in secured relation to said body member, an inner member normally disposed in telescopic relation to said outer member with a portion thereof extending into said opening, axially opposed surfaces on said outer member and said inner member, at least a portion of said axially opposed surfaces on each of said inner and outer members being sloped downwardly away from the longitudinal axis of said opening, an annular sealing ring having in radial cross section a tapered base portion, said sealing ring having a lower outer extremity engaging said upper edge of said opening, said tapered base portion having an inner surface engaged by the axially opposed surface on said inner member along a line disposed above the line of engagement of said tapered base portion with said upper edge of said opening, said sealing ring member having an upper portion provided with an outwardly and downwardly sloped abutment surface projecting about said opening engaged by said sloped portion of said axially opposed surface on said outer member, and means for causing relative movement between said inner and outer members so as to compress said sealing ring member therebetween.

4. In a high pressure vessel having a hollow body member with a circular opening therein of which the upper edge is outwardly and upwardly beveled, a sealing assembly comprising an outer member disposed entirely without said opening, said outer member held in secured relation to said body member, an inner member normally disposed in telescopic relation to said outer member with a portion thereof extending into said opening, axially opposed surfaces on said outer member and said inner member, and an annular sealing ring member having in radial cross section a tapered base portion of which the lower outer extremity engages said upper edge of said opening, said tapered base portion having an inner surface engaging said axially opposed surface on said inner member along a line disposed above the line of engagement of said tapered base portion with said upper edge of said opening, said sealing ring member having an upper portion projecting above said opening in said body member, said axially opposed surface on said outer member having a portion facing inwardly for resisting the outward radial movement of said upper surface of said sealing ring when said sealing ring member is compressed between said axially opposed surfaces.

5. In a high pressure vessel having a hollow body member with a circular opening therein of which the upper edge is outwardly and upwardly beveled, a sealing assembly comprising an outer member disposed entirely without said opening, said outer member held in secured relation to said body member, an inner member normally disposed in telescopic relation to said outer member with a portion thereof extending into said opening, axially opposed surfaces on said outer member and said inner member, an annular sealing ring member having a lower outer edge engaging said upper edge of said opening with a substantial portion of said sealing ring member disposed externally of said opening, an abutment member adjustably disposed in secured relation to said inner member, a plurality of abutment screws threaded through said abutment member for abutting means disposed in secured relation to said body member so that said inner member may be moved axially with respect to said outer member to compress said annular sealing ring between said axially opposed surfaces and against said wall of said opening, the axially opposed surface on said inner member normally engaging said sealing ring member along a line above the line of engagement of said ring member with said upper edge of said opening in said body member, said axially opposed surface on said outer member facing inwardly for resisting the outward radial movement of said upper surface of said sealing ring when said sealing ring member is compressed between said axially opposed surfaces.

References Cited in the file of this patent

UNITED STATES PATENTS

| Number | Name | Date |
|---|---|---|
| 1,722,623 | Bramwell | July 30, 1929 |
| 2,298,511 | Rathbun | Oct. 13, 1942 |
| 2,305,590 | Marburg | Dec. 22, 1942 |
| 2,424,449 | Gasche | July 22, 1947 |
| 2,426,392 | Fennema | Aug. 26, 1947 |
| 2,576,592 | Giauque | Nov. 27, 1951 |